(No Model.)
R. M. RILEY & U. S. G. BROWN.
COLLAPSIBLE CARRIER FOR BICYCLES.
No. 592,830. Patented Nov. 2, 1897.
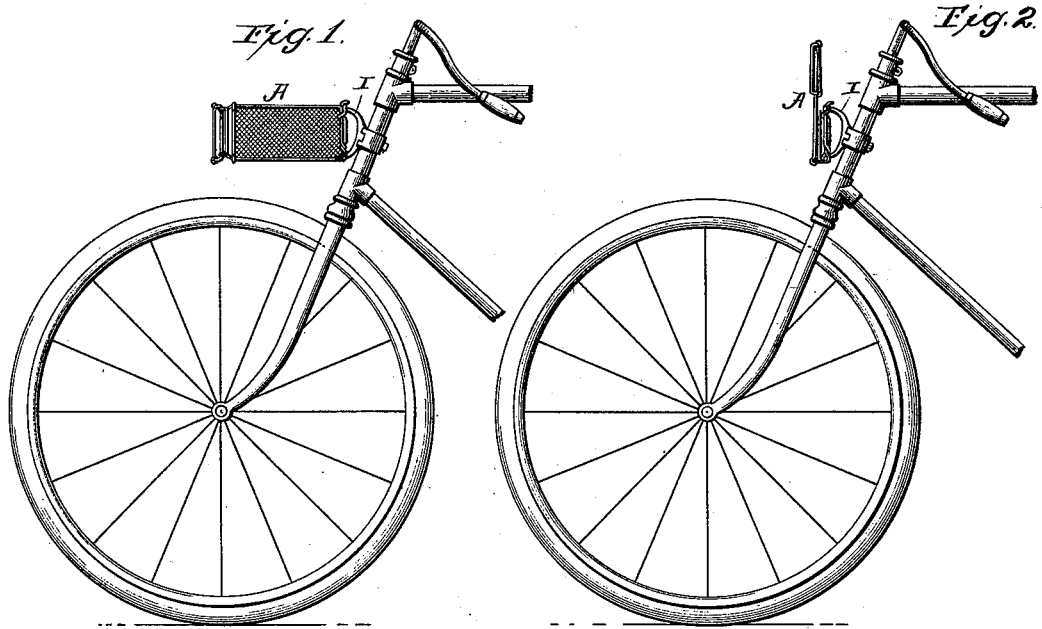
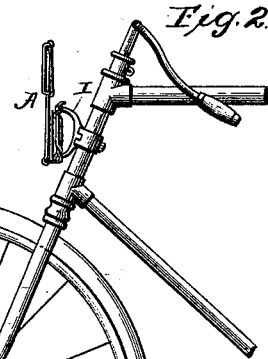
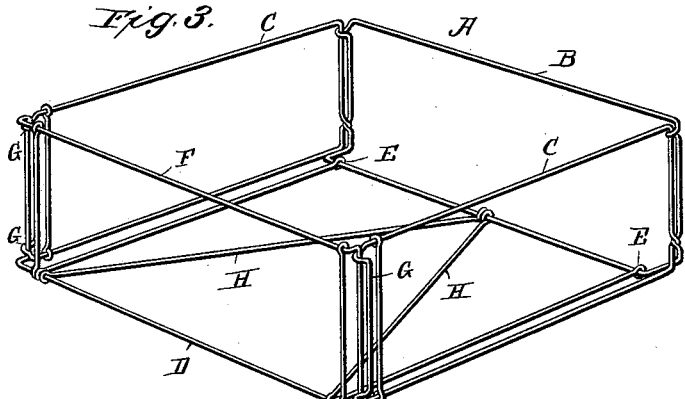
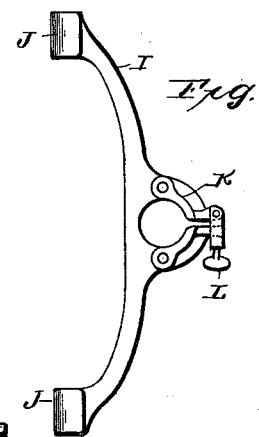
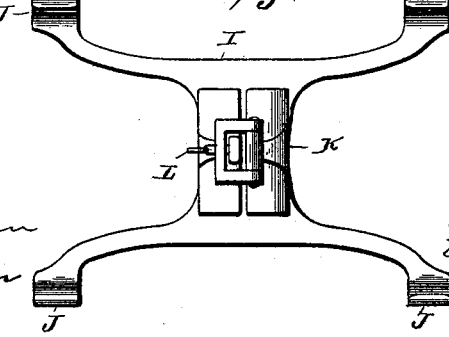
Witnesses
E. C. Wurdeman
J. J. Williamson
Inventors:
Robert M. Riley
Ulysses S. G. Brown
by Geo. H. Holgate
Attorney

UNITED STATES PATENT OFFICE.

ROBERT M. RILEY AND ULYSSES S. G. BROWN, OF NEW YORK, N. Y.

COLLAPSIBLE CARRIER FOR BICYCLES.

SPECIFICATION forming part of Letters Patent No. 592,830, dated November 2, 1897.

Application filed February 4, 1897. Serial No. 621,930. (No model.)

*To all whom it may concern:*

Be it known that we, ROBERT M. RILEY and ULYSSES S. G. BROWN, citizens of the United States, residing at New York, in the county of New York and State of New York, have invented a certain new and useful Improvement in Collapsible Carriers for Bicycles, of which the following is a full, clear, and exact specification.

Our invention relates to a new and useful improvement in carriers for bicycles and the like, and has for its object to so construct a device of this description as to adapt it to be readily folded when not in use without being removed from the bicycle, thereby causing it to occupy less space and present a more sightly appearance and also to permit the removal of the carrier from the bicycle or its reattachment thereto.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 represents our improved carrier when attached to the head of a bicycle and adjusted for use; Fig. 2, a similar view showing the carrier folded; Fig. 3, a perspective of the carrier removed from the bicycle; Fig. 4, a plan view of the bracket-clamp for supporting the carrier, and Fig. 5 a rear view thereof.

In carrying out our invention as here embodied, A represents the receptacle or carrier proper, which is composed of a rectangular wire frame B, having hinged thereto by any suitable means the side rectangular frames C, and these last-named frames are of such a length as to be swung inward against the frame B and parallel, as shown in Fig. 2.

D is the bottom frame, which is hinged at E to the lower portion of the frame B, so that it may be swung upward when not in use, and to this bottom is hinged the front rectangular frame F, and this last-named frame may also be swung against the bottom frame.

From this description it will be seen that when the device is not in use it may be folded and refolded so as to occupy a small compass, as shown in Fig. 2, but when it is to be adjusted for use the bottom is swung downward, the frame F turned up, and the frames E swung outward, so that their hooked ends G will enter into engagement with the side bar of the frame F, as clearly shown in Fig. 3, which will lock the several parts in this adjustment and render the receptacle as rigid as though it were not made to fold. As a further means of strengthening and rendering the receptacle rigid stay-rods H may be run diagonally across the bottom frame, and, while we have shown two of such rods, it is obvious that any number may be used for this purpose.

The sides and bottom of the receptacle are inclosed by a suitable netting, as clearly shown, and the device is supported upon the bicycle by the bracket I, which is composed of four arms, each terminating in a clip J, adapted to engage the top and bottom of the back frame B, and this bracket is also provided with a clamp K, consisting of hinged sections adapted to embrace the head of the bicycle-frame and be secured thereon by a set-screw L. By this arrangement it will be seen that the carrier may be quickly attached to or detached from the bicycle, and when in place will be securely held, so as to sustain the weight of articles placed within the carrier. It is also clear that the carrier may be removed from the bracket without disturbing the position of the latter upon the bicycle by disengaging the frame B from the clips J, and this is sometimes desirable, since the carrier can then be used as a receptacle for conveying the articles contained therein to any locality after the bicycle has been stopped, thus enabling a person to utilize a bicycle as a delivery-vehicle without having to remove the articles conveyed thereby in delivering the same.

It is not desired to limit this invention to the exact construction here shown, as the gist thereof rests in the broad idea of providing a collapsible or folding carrier for a bicycle or the like.

Having thus fully described this invention, what is claimed as new and useful is—

1. A bicycle-carrier consisting of a receptacle, the bottom, sides and ends of which are formed of wire frames, the sides being hinged to the rear frame to fold inwardly, the front frame and side frames having their ends hooked so that they may be easily engaged or disengaged to hold the receptacle extended or allow it to be collapsed, the bottom being hinged to the front and rear frames to fold upwardly, and a clamp for securing the receptacle to a bicycle, substantially as described.

2. A bicycle-carrier consisting of a receptacle, the bottom, sides and ends of which are formed of wire frames, the end bars of the side and rear frame being so coiled about each other as to allow the parts to fold inwardly, the front part of the sides being hooked to engage the front frame to hold the receptacle in its extended position, the lower portion of the rear frame being bent up to form a space in which the sides may be folded, a bottom hinged to the front and rear frames to fold upwardly, and a clamp, four arms formed on the clamp, and hooks on the ends of the arms to engage the top and bottom bars of the rear frame, as and for the purpose described.

In testimony whereof we have hereunto affixed our signatures in the presence of two subscribing witnesses.

ROBERT M. RILEY.
ULYSSES S. G. BROWN.

Witnesses:
S. S. WILLIAMSON,
R. M. PIERCE.